April 22, 1952 — R. P. BALLOU — 2,593,961
CURRENT DISTRIBUTION AND CONTROL UNIT
Filed June 24, 1950 — 3 Sheets-Sheet 1
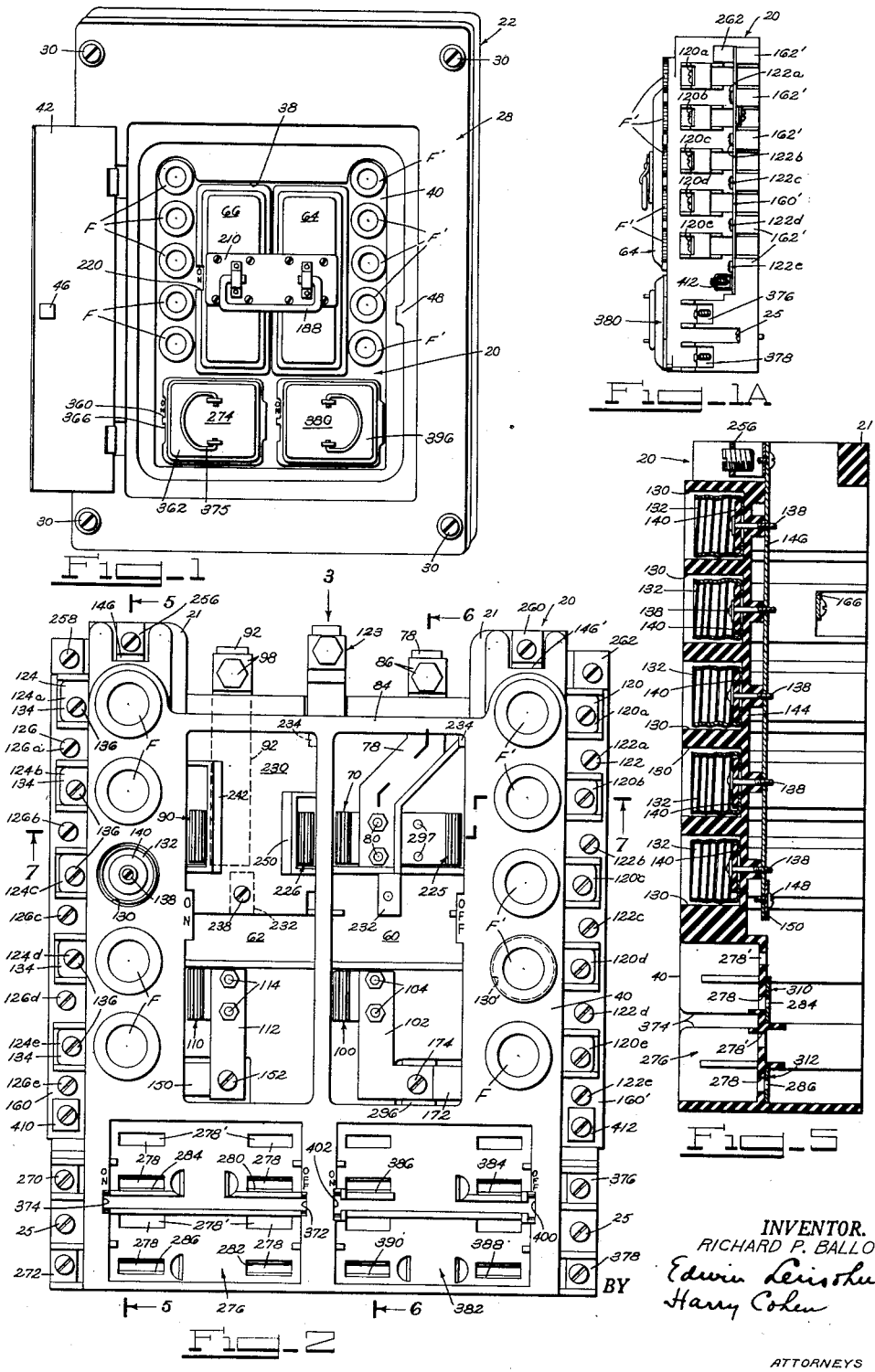
INVENTOR.
RICHARD P. BALLOU
BY Edwin Leisohn & Harry Cohen
ATTORNEYS

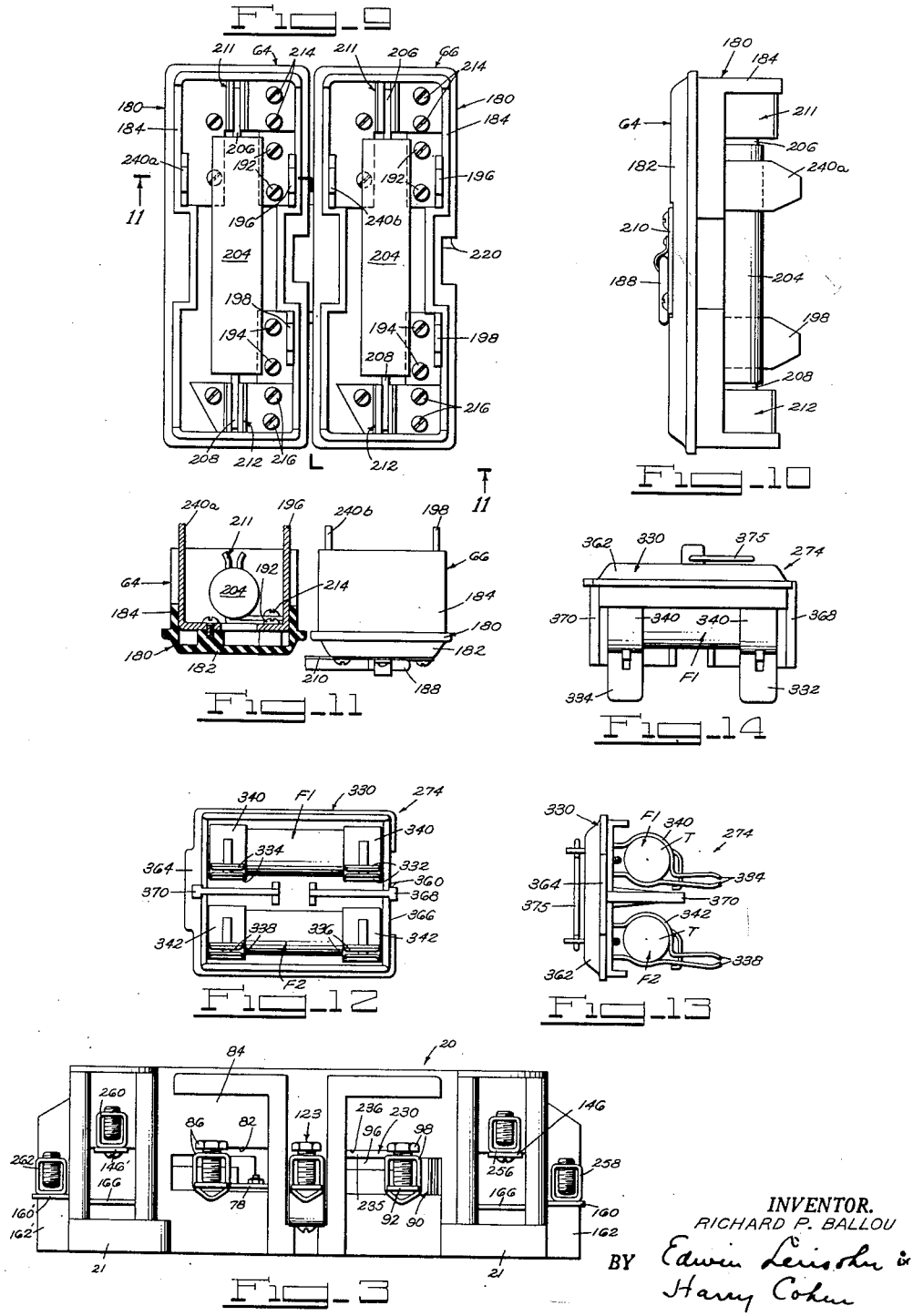

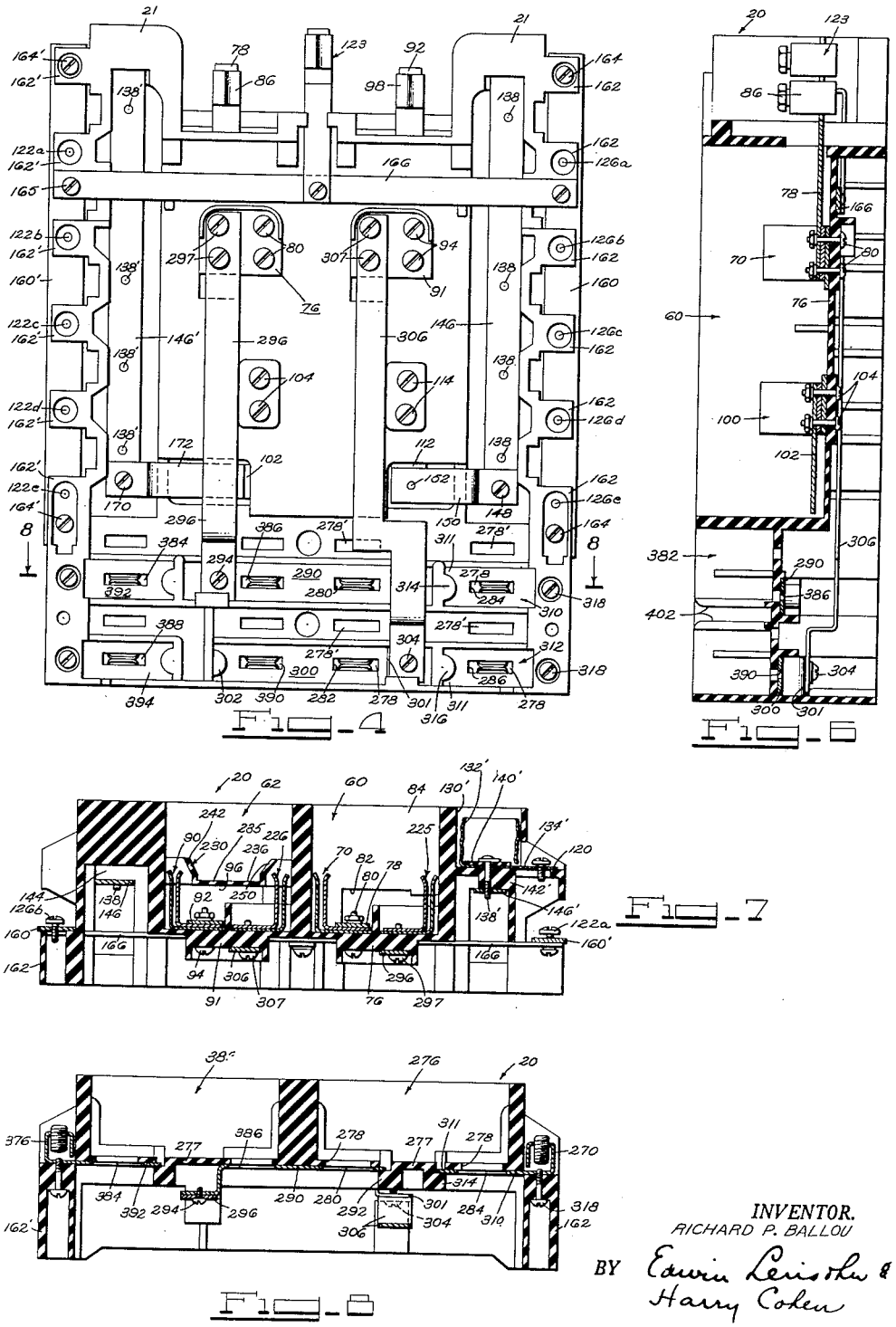

Patented Apr. 22, 1952

2,593,961

UNITED STATES PATENT OFFICE 2,593,961

CURRENT DISTRIBUTION AND CONTROL UNIT

Richard P. Ballou, Hartford, Conn., assignor to Federal Electric Products Company, Newark, N. J., a corporation Application June 24, 1950, Serial No. 170,066

17 Claims. (Cl. 175—298)

This invention relates generally to switch controls for parallel circuit arrangements, and more especially to current-distributing switch blocks therefor. The subject matter of this application is related to the invention disclosed in my copending application Serial No. 154,559.

It is an object of the present invention to arrange in a current-distribution block a pull-out type main switch having fused and non-fused sections for feeding different branch circuits, respectively, thereby to attain a maximum over-all rating or capacity of the block and also permit the simultaneous interruption of all branch circuits through operation of a single disconnect means.

It is another object of the present invention to provide in a block of this type an auxiliary pull-out type switch or switches for the branch circuit or circuits which are fed by the non-fused section of the main switch in the block, thereby to afford control over the latter circuit or circuits independently of the other branch circuit or circuits.

It is another object of the present invention to fuse the auxiliary switch or switches in the block to a permissible maximum load or loads which may well be in excess of the maximum load permitted by the fuse in the main switch in the block, thereby attaining full load control over all branch circuits and having all load-controlling fuses readily accessible in the block.

The above and other objects, features and advantages of the present invention will be more fully understood from the following description considered in connection with the accompanying illustrative drawings.

In the drawings:

Fig. 1 is a perspective view of an enclosed distribution block embodying the present invention;

Fig. 1A is a side elevation of the block itself;

Fig. 2 is a front view of the block, drawn to a larger scale than in Figs. 1 and 1A;

Fig. 3 is an end elevation of the block as viewed in the direction of the arrow 3 in Fig. 2;

Fig. 4 is a rear view of the block;

Figs. 5 and 6 are longitudinal sections through the block, taken substantially on the lines 5—5 and 6—6, respectively, of Fig. 2;

Fig. 7 is a transverse section through the block, taken substantially on the line 7—7 of Fig. 2;

Fig. 8 is another transverse section through the block, taken substantially on the line 8—8 of Fig. 4;

Figs. 9 and 10 are rear and side views, respectively, of a main switch used in the instant block;

Fig. 11 is a section taken substantially on the line 11—11 of Fig. 9; and

Figs. 12, 13 and 14 are rear, end and side views, respectively, of an auxiliary switch used in the instant block.

Referring now to the drawings, and more especially to Fig. 1 thereof, the reference numeral 20 designates a current-distribution block for a plurality of branch circuits. The block 20 is, in the present instance, of the pull-out switch type, and is enclosed in a panel box or metal enclosure 22. The panel box 22, which is open at the front thereof, is normally closed by a trim or cover member 28 which is removably mounted on the box 22 in any suitable manner, as by screws 30, for instance. The block 20 is suitably mounted in the panel box 22, preferably on the rear wall thereof, and the trim member 28 is provided with an inwardly offset opening 38 in which to expose the front face 40 of the mounted block 20. The opening 38 in the trim member 28 is normally closed by a hinged door 42 on the latter. A latch 46, preferably of a spring-type, on the door 42 serves for releasably locking the latter in its closed position to a lug 48 on the trim member 28. The panel box 22, which may have provisions (not shown) for mounting it on any suitable upright support, is in one or more of its walls preferably also provided with the usual knock-outs (not shown) through which to pass the wiring for the block.

Referring now to Figs. 2 to 8, inclusive, there is shown the current-distribution block 20 which may advantageously be molded in one piece from any suitable insulating material, such as "Bakelite," for instance. The block 20 is in the rear and at the top thereof provided with opposite ribs 21 (Figs. 4 and 5) by means of which the block may be suspended from suitable hooks (not shown) on the rear wall of the panel box 22. The block 20 may further be secured to the rear wall of the panel box 22 by screws 25 (Fig. 2). Provided in the block 20 on opposite sides of its longitudinal center line are receptacles 60 and 62, respectively, for the reception of main switches 64 and 66, respectively, which in the present instance, are of the pull-out type (Figs. 1 and 9 to 11). Provided in the receptacle 60 is a "live" contact 70 which may be of the clip-type shown in Fig. 7. Contact 70 is, by means of screws 80, secured to the bottom 76 of the receptacle 60 and connected with a terminal 78 (Figs. 2 and 7). The terminal 78, being a lead-in terminal for one of the live wires of a three-wire supply system used in the present instance, extends through an opening 82 in the adjacent end wall 84 of the block 20 (Figs. 3 and 7) and carries conventional clamp-on provisions 86 for the live wire.

Provided in the other receptacle 62 is another "live" contact 90 which may be of the same clip-type as the contact 70 in the receptacle 60, and is secured to the bottom 91 of the receptacle 62 and connected with a terminal 92 by screws 94 (Fig. 7). The terminal 92, which is a lead-in terminal for the other live wire of the three-wire supply system, extends through an opening 96 in the adjacent end wall 84 of the block 20 and carries wire clamp-on provisions 98.

Further provided in the receptacle 60 is another clip-type contact 100 which is a companion to the adjacent contact 70 and connected with the latter by the main switch 64 when the same is in its circuit-closing position in the receptacle 60 (Fig. 1). The contact 100 is secured to the bottom 76 of the receptacle 60, as well as connected with a bus bar 102, by screws 104 (Figs. 2 and 6).

Further provided in the receptacle 62 is another clip-type contact 110 which is a companion to the adjacent contact 90 and will be connected with the latter by the main switch 66 when the same is in its circuit-closing position in the receptacle 62 (Fig. 1). The contact 110 is secured to the bottom 91 of the receptacle 62, as well as connected with a bus bar 112, by screws 114 (Fig. 2).

Provided on one side of the block 20 are a number of pairs of companion terminals 120 and 122 for connection with a like number of branch circuits, respectively. The terminals 120 are live-wire terminals, being connected with the contact 100 in the receptacle 60 in a manner hereinafter described, while the terminals 122 are neutral-wire terminals being connected in a manner to be described with a lead-in terminal 123 for the neutral wire of the three-wire supply system. More particularly, the terminals 120 and 122 are so closely coordinated (Fig. 1A) that the terminal pairs 120a, 122a to 120e, 122e are readily recognized as the correct connections for the respective branch circuits.

The block 20 is provided on the other side thereof with pairs of terminals 124 and 126, preferably for connection with the same number of branch circuits as on the opposite side of the block. The terminals 124 and 126 are live and neutral-wire terminals, respectively, which in a manner hereinafter described are connected with the contact 110 and with the neutral-wire lead-in terminal 123, respectively. As in the case of the terminals 120 and 122, the terminals 124 and 126 are arranged in closely coordinated pairs 124a, 126a to 124e, 126e (Fig. 2) which are readily recognized as the correct connections for the respective branch circuits.

The connection between the contact 110 and each of the live-wire terminals 124 has an interposed fuse F which may be of the screw type shown in Fig. 2. To this end, the block 20 is in its front face and along one side provided with openings 130 for the reception of metallic sockets 132, respectively, (Fig. 5) which are associated with the adjacent terminal pairs 124a, 126a to 124e, 126e in the manner shown in Fig. 2. The sockets 132 serve for the reception of the fuses F. The live-wire terminals 124 are, in the present instance, formed by lateral extensions 134 on the bottoms of the sockets 132, respectively. Each terminal 124 is provided with a screw 136 for connecting therewith the live wire of the respective branch circuit. While each socket 132 constitutes one terminal for the inserted fuse F, the other terminal therefor is formed by the head of a conductive screw 138 (Fig. 5) which passes through an insulating washer 140 in the bottom of the socket and through a wall 144 in the block 20, and is threadedly received by a bus bar 146 which, as shown in Fig. 4, is connected at 148 with a conductive bar 150 that is, in turn, connected at 152 with the bus bar 112. The neutral-wire terminals 126 are provided by screws which are received in a bus bar 160 that extends over longitudinally spaced side lugs 162 on the block 20 and is secured to the endmost of these lugs 162 by screws 164 (Fig. 4). The bus bar 160 is through a transverse bar 166 electrically connected with the lead-in terminal 123 for the neutral line wire (Fig. 4). The transverse bar 166 extends beneath the receptacles 60 and 62 and is thus effectively insulated from the hot terminals 78 and 92 in these receptacles by the bottoms 76 and 91 of the latter (Fig. 7). The block 20 is in its front face 40 provided with further openings 130' (Figs. 2 and 7) which, in the present instance, are equal in number to the openings 130 and adapted for the reception of metallic sockets 132' for screw type fuses F' for further branch circuits. The bottoms of the sockets 132' have lateral extensions 134' (Fig. 7) which form the live-wire terminals 120, respectively. While each of the sockets 132' constitutes a terminal for an inserted fuse F', the other terminal therefor is formed by the head of a conductive screw 138' (Fig. 7) which passes through an insulated washer 140' in the bottom of the socket and through a wall 142' of the block, and is threadedly received by a bus bar 146' which, as shown in Fig. 4, is connected at 170 with a conductive strip 172 that is, in turn, connected at 174 with the bus bar 102 (Fig. 2). The neutral wire terminals 122 are provided by screws which are threadedly received by a bus bar 160' that extends over spaced side lugs 162' on the block 20 and is secured to the endmost of these lugs by screws 164' (Fig. 4). The bus bar 160' is connected at 165 with the transverse bar 166 which, as previously described, is connected with the lead-in terminal 123 for the neutral line wire.

Referring now to Figs. 9 to 11, the main switches 64 and 66, which in their circuit-closing position in the block 20 (Fig. 1) are adapted to connect the contacts 70 and 100 and the contacts 90 and 110, respectively, are in the present instance identical. Thus, each main switch comprises a preferably molded insulating frame 180, having a front cover plate 182 and a depending circumferential skirt 184 which fits into either of the receptacles 60 or 62 in the block 20. Suitably mounted, as by screws 192 and 194, on the inside of the top cover plate 182 of each main switch are contacts 196 and 198, respectively. Connection between the contacts 196 and 198 of each main switch is made by a cartridge-type fuse 204 of which the contact ends 206 and 208 are releasably held in conductive clips 211 and 212, respectively, which are connected at 214 and 216 with the contacts 196 and 198, respectively. The main switches 64 and 66 are, in the present instance, joined by a plate 210 across their front cover plates 182 so that these switches form a single unit for simultaneously opening and closing all branch circuits so far referred to. The connecting plate 210 is provided with a preferably pivoted handle 188 for the simultaneous manipulation of both main switches 64 and 66. Instead of joining the separate main switches 64 and 66 by the connecting plate 210, the frames 180 of these switches may be molded in a single piece. The contacts 196 and 198 of the main switches 64 and 66 will, on insertion of the latter in circuit-closing position in the receptacles 60 and 62, respectively, enter between and engage the clip-type contacts 70, 100 in receptacle 60 and the contacts 90, 110 in receptacle 62, respectively, and thereby close all branch circuits associated therewith. To open these branch circuits, the main switches 64 and 66 are withdrawn from the receptacles 60 and 62 and may in inverted disposition be inserted in these receptacles for safe-keeping while the branch circuits remain open. The front face 40 of the block 20 preferably bears adjacent the receptacles 62 and 60 the legends "On" and "Off," respectively, of which the legend "On" is exposed and readily discernible in a side notch 220 in the top cover plate 182 of the main switch 66 when both switches are in their circuit-closing position in the block 20 (Fig. 1). Conversely, if the main switches 64 and 66 are inserted in their respective receptacles 62 and 60 in circuit-opening position therein, the notch 220 in the switch 66 will expose for ready discernibility the legend "Off" on the block 20. Thus, an observer may at a glance determine whether the inserted switches 64 and 66 are in circuit-closing position or in circuit-opening position.

Mounted in the receptacles 60 and 62 of the block 20 adjacent, but spaced from, the contacts 70 and 90, respectively, are further clip-type contacts 225 and 226, respectively, which, besides being connected with further branch circuits in a manner hereinafter described, serve also for releasably holding the main switches 64 and 66 in their circuit-opening position in the block 20. Thus, the clip-type contacts 225 and 226 are used to clamp the contacts 198 of the main switches 64 and 66, respectively, in the circuit-opening position of the latter in the block, as will be readily understood.

To protect a person, on removal of the main switches 64 and 66 from the block 20, from possible contact with the live conductors in the block, these being the live-wire terminals 78 and 92 and the live contacts 70 and 90 (Fig. 2), these live conductors are within the confines of the opening 38 in the trim member 28 on the panel box 22 preferably shielded by insulating covers 230 of which one is provided for each receptacle 60 and 62, although only one cover 230 is shown in the drawings. For mounting the covers 230, there are provided in each of the receptacles 60 and 62 raised lugs 232 and 234 on which may rest a cover 230 with one end 235 thereof projecting underneath the top edge 236 of the opening 96 in the end wall 84 of the block 20 (Fig. 3), while the other end of the cover may be secured, as by a screw 238, to the lug 232. Each cover 230 has a raised rib 242 (Figs. 2 and 7) which, together with the adjacent wall of the receptacle in which the cover is located, forms a guard through which the correct switch contact, but not the finger of a human hand, may move into engagement with the shielded live contact in the receptacle. Both covers 230, which are preferably alike in every respect, are provided with further raised ribs 250 to provide passages to the adjacent contacts 225 and 226 in the respective receptacles 60 and 62.

In order to permit the connection of the instant block 20 with more branch circuits than is afforded by the terminals 120, 122, 124 and 126, there are provided on the associated live and neutral bus bars 146 and 160 further terminals 256 and 258, respectively (Figs. 2 and 3). Likewise, the associated live and neutral bus bars 146' and 160' at the other side of the block 20 are preferably provided with further terminals 260 and 262, respectively. Thus, in the present example, the block 20 described so far has provisions for connecting therewith twelve branch circuits, six on each side of the block. These branch circuits, being connected with the neutral wire of the line, as described, carry current of approximately one-half the voltage of that across the live wires of the supply system, as will be readily understood.

The instant block 20 has also provisions for connecting therewith a branch circuit or circuits requiring the full voltage across the live wires of the three-wire supply system. To this end, the contacts 225 and 226 in the block receptacles 60 and 62, respectively, are connected with terminals 270 and 272, respectively, on one side of the block 20 by way of an auxiliary pull-out type switch 274 (Figs. 1 and 12 to 14). The switch 274 is in its circuit-closing position received in a receptacle 276 provided in the block 20. The bottom 277 of the receptacle 276 is provided with a plurality of slots 278, in the present instance eight, in four of which are exposed fixed contacts 280, 282, 284 and 286. The contact 280 is formed by a slotted portion of a conductive strip 290 (Figs. 4 and 8) which is mounted in place by having one end thereof inserted in a slotted lug 292 on the bottom wall 277 of the receptacle 276 (Fig. 8), and having its other end connected at 294 with a bus bar 296 which extends underneath the bottom 76 of the receptacle 60 (Fig. 4) and is connected with the contact 225 by conductive screws 297 by means of which both, the bus bar 296 and the contact 225, are secured to the bottom wall 76 of the receptacle 60 (Fig. 7). Contact 282 is formed by a slotted portion of a conductive strip 300 (Fig. 4) which is mounted in place by having one end received in a slotted lug 302 on the bottom wall 277 of the receptacle 276, and by having its other upturned end 301 connected at 304 with a bus bar 306 which extends underneath the bottom wall 91 of the receptacle 62 (Figs. 4 and 7) and is connected with the contact 226 in the latter by conductive screws 307 by means of which both, the bus bar 306 and the contact 226, are secured to the bottom wall 91 of the receptacle 62. Since the contacts 225 and 226 are, in the circuit-closing position of the main switches 64 and 66, connected with the adjacent live contacts 70 and 90, respectively, in a manner described hereinafter, the contacts 280 and 282 in the receptacle 276 will be live contacts when the main switches 64 and 66 are in their referred to circuit-closing position in the block 20. The contacts 284 and 286, which are companions to the contacts 280 and 282, respectively, are formed by slotted portions of conductive strips 310 and 312, respectively, which are mounted in place by having their inner ends 311 inserted in slotted lugs 314 and 316, respectively, on the bottom wall 277 of the receptacle 276 (Figs. 4 and 8), and by being secured by screws 318 to one of the adjacent side lugs 162 on the block 20. The outer ends of the strips 310 and 312 may conveniently be formed into the terminals 270 and 272, respectively, in the manner best shown in Fig. 8.

In order to connect the contacts 70 and 225 and the contacts 90 and 226 in the block receptacles 60 and 62, respectively, the contacts 196 on the main switches 64 and 66 are extended to provide further contacts or stabs 240a and 240b, respectively, (Figs. 9 and 11) which in the circuit-closing position of the switches 64 and 66 in the block 20 conductively engage the contacts 225 and 226 in the receptacles 60 and 62, respectively. Hence, the contacts 280 and 282 in the block receptacle 276 receive, in the circuit-closing position of the main switches 64 and 66, current directly from the live contacts 70 and 90, respectively, without intervention from the cartridge-type fuses 204 in these main switches 64 and 66.

The companion contacts 280, 284 and 282, 286 are bridged by the auxiliary switch 274 in its circuit-closing position in the receptacle 276 (Fig. 1). To this end, the switch 274, which may have a molded frame 330 (Figs. 12 and 14), carries clip-type companion contacts 332, 334 and 336, 338 of which the contacts of both pairs are formed to provide receptacles 340 and 342, respectively, for the cylindrical contacts T of cartridge-type fuses F1 and F2, respectively. The contacts 332, 334, 336 and 338 will, on insertion of the switch 274 in the receptacle 276 into circuit-closing position therein, engage the fixed contacts 284, 280, 286 and 282, respectively, in the receptacle 276 and close the branch circuit leading from the terminals 270 and 272. To open this branch circuit, it is merely necessary to pull the switch 274 out of the receptacle 276, unless the same circuit is already opened by the main switches 64, 66. The switch 274 may in inverted disposition be inserted in the receptacle 276 for safe-keeping therein while the associated branch circuit is open, in which case the contacts 232 to 338 will enter and be yieldingly held in the empty slots 278' in the bottom of the receptacle 276, as will be readily understood. In order to indicate to an observer whether the auxiliary switch 274 is in its circuit-closing or circuit-opening position in the receptacle 276, the front face 40 of the block 20 preferably bears on the opposite sides of the receptacle 276 the legends "On" and "Off," respectively. When the switch 274 is in its circuit-closing position in the receptacle 276, a side notch 360 in the switch front cover 362 (Figs. 1 and 12) exposes the legend "On" adjacent the receptacle 276, while a marginal extension 364 on the opposite side of the switch covers the legend "Off" adjacent the receptacle 276. Conversely, when the switch 274 is inserted in the receptacle 276 in its circuit-opening position therein, a side notch 366 in the switch front cover 362 will expose the legend "Off," while the switch extension 364 will cover the legend "On," as will be readily understood. The switch 274 is for its manipulation preferably provided with a pivoted handle 375. For ready guidance of the contacts 332 to 338 on the switch 274 into the aligned slots in the bottom of the receptacle 276, the switch is provided with opposite guide ribs 368 and 370 which are alternately slidably receivable in opposite guide grooves 372 and 374 in the block 20.

The block 20 may, for its connection with another full-voltage branch circuit, be provided with further live wire terminals 376 and 378 (Fig. 2) which are connected with the contacts 225 and 226 in the receptacles 60 and 62, respectively, by way of another auxiliary pullout type breaker 380 (Fig. 1) in a receptacle 382 in the block 20 (Fig. 2). The switch 380 may, with one exception to be described, be exactly like the described switch 274, and its fuse-connected contact pairs will, in the circuit-closing position of the switch 380 in the receptable 382, connect fixed contacts 384 and 386 and fixed contacts 388 and 390, respectively, in said receptacle 382. As shown in Figs. 4 and 8, the contacts 384 and 388 are formed by slotted portions of conductive strips 392 and 394, respectively, which are similar to and mounted like the strips 310 and 312 on the opposite side of the block 20. Also, the outer ends of the strips 392 and 394 are formed into the terminals 376 and 378, respectively (Fig. 8). The other fixed contacts 386 and 390 in the receptacle 382 are provided by slotted portions of the previously described conductive strips 290 and 300, respectively (Fig. 4). Thus, on inserting the switch 380 in the receptacle 382 into its circuit-closing position therein, in which a notch in, a lateral extension on, the front cover 396 of the switch exposes the legend "On" and covers the legend "Off," respectively, adjacent the receptacle 382 (Fig. 1), the branch circuit leading from the terminals 376 and 378 is connected with the live wires of the three-wire supply system when the main switches 64, 66 are in their circuit-closing position in the block 20, as will be readily understood. The switch 380 is, for the correct guidance of its contacts into the aligned slots in the bottom of the receptacle 382, provided with opposite guide ribs (not shown) which are alternately slidably receivable in opposite guide grooves 400 and 402 in the opposite sides of the receptacle 382. The guide ribs on the auxiliary switch 380 are preferably dimensioned differently than those on the other auxiliary switch 274, so that these switches may not be used interchangeably in the receptacles 276 and 382, but only in the ones with which they are positively identified by suitable legends, for instance, on their respective front covers, describing the type of service for which the respective branch circuits are intended, such as for a cooking-range and for a water heater, for instance.

The neutral bus bars 160 and 160' on the opposite sides, respectively, of the blocks 20 are provided with further terminals 410 and 412, respectively, (Fig. 2). Thus, either one of the branch circuits leading from the terminals 270 and 272 and from the terminals 376 and 378, respectively, may, if desired, be supplied with current of approximately ½ the voltage of that across the live wires of the three-wire supply system, by simply connecting either side of the circuit with the adjacent neutral-wire terminal 410 or 412, as will be readily understood.

With the instant construction and arrangement of the block 20 and the main switches 64 and 66, the full-voltage branch circuits leading from the terminals 270, 272 and 376, 378 (Fig. 2) are not in any way limited to the loads permitted by the fuses 204 in the main switches 64 and 66, and are opened simultaneously with all other branch circuits when these main switches are pulled out of the block. The overall rating or capacity of the block may thus be considerably increased, and all branch circuits may be opened through operation of a single disconnect means. By providing the block with the auxiliary switches 274 and 380, ready control is afforded over the above-mentioned full-voltage branch circuits independently of the other branch circuits. Further, by providing the auxiliary switches 274 and 380 also with fuses, full load-control is attained over all branch circuits and all load-controlling fuses are readily accessible in the block.

While I have shown and described the preferred embodiment of my invention, it will be understood that various changes may be made in the present invention without departing from the underlying idea or principles of the invention within the scope of the appended claims.

Having thus described my invention, what I claim and desire to secure by Letters Patent, is:

1. A current distribution and control unit for a plurality of load circuits, comprising switching means provided with first and second switch contacts for connection respectively to a line terminal and to a load terminal of one of said load circuits, a third switch contact for connection to said first contact and to a load terminal of another of said load circuits, and a movable switching member having first and second contacts engageable with said first mentioned first and second switch contacts, respectively, in the closed condition of said switching means, current-responsive means connecting said contacts of said movable switching member, an additional contact on, and connected directly to said first contact of, said movable switching member and engaging said third switch contact in said closed condition of said switching means.

2. A current distribution and control unit for a plurality of load circuits, comprising switching means provided with first and second switch contacts for connection respectively to a line terminal and to a load terminal of one of said load circuits, a third switch contact for connection to said first contact and to a load terminal of another of said load circuits, and a movable switching member having first and second contacts engageable with said first mentioned first and second switch contacts, respectively, in the closed condition of said switching means, current-responsive means connecting said contacts of said movable switching member, an additional contact on, and connected directly to said first contact of, said movable switching member and engaging said third switch contact in said closed condition of said switching means, all of said contacts of said movable switching member being disengageable as a unit from said first mentioned switch contacts, respectively, for simultaneously disconnecting all of said load circuits from said line terminal.

3. A current distribution and control unit for a plurality of load circuits, comprising switching means provided with first and second switch contacts for connection respectively to a line terminal and to a load terminal of one of said load circuits, a third switch contact for connection to said first contact and to a load terminal of another of said load circuits, current-responsive means connecting said third contact to said last mentioned load terminal, and a movable switching member having first and second contacts engageable with said first mentioned first and second switch contacts, respectively, in the closed condition of said switching means, current-responsive means connecting said contacts of said movable switching member, an additional contact on, and connected directly to said first contact of, said movable switching member and engaging said third switch contact in said closed condition of said switching means.

4. A current distribution and control unit for a plurality of load circuits, comprising switching means provided with first and second switch contacts for connection respectively to a line terminal and to a load terminal of one of said load circuits, a third switch contact for connection to said first contact and to a load terminal of another of said load circuits, a fused pull-out switch member connecting said third contact to said last mentioned load terminal, and a movable switching member having first and second contacts engageable with said first mentioned first and second switch contacts, respectively, in the closed condition of said switching means, current-responsive means connecting said contacts of said movable switching member, an additional contact on, and connected directly to said first contact of, said movable switching member and engaging said third switch contact in said closed condition of said switching means.

5. A current distribtuion and control unit for a plurality of load circuits, comprising switching means provided with first and second switch contacts for connection respectively to a line terminal and to a load terminal of one of said load circuits, a third switch contact for connection to said first contact and to a load terminal of another of said load circuits, current-responsive means connecting said third contact to said last mentioned load terminal, and a movable switching member having first and second contacts engageable with said first mentioned first and second switch contacts, respectively, in the closed condition of said switching means, current-responsive means connecting said contacts of said movable switching member, an additional contact on, and connected directly to said first contact of, said movable switching member and engaging said third switch contact in said closed condition of said switching means, all of said contacts of said movable switching member being disengageable as a unit from said first mentioned switch contacts, respectively, for simultaneously disconnecting all of said load circuits from said line terminal.

6. A current distribution and control unit for a plurality of load circuits, comprising switching means provided with first and second switch contacts for connection respectively to a line terminal and to a load terminal of one of said load circuits, a third switch contact for connection to said first contact and to a load terminal of another of said load circuits, and a pull-out switch member having first and second contacts engageable with said first mentioned first and second switch contacts, respectively, in the closed condition of said switching means, current-responsive means connecting said contacts of said switch member, an additional contact on, and connected directly to said first contact of, said switch member and engaging said third switch contact in said closed condition of said switching means.

7. A current distribution and control unit for a plurality of load circuits, comprising switching means provided with first and second switch contacts for connection respectively to a line terminal and to a load terminal of one of said load circuits, a third switch contact for connection to said first contact and to a load terminal of another of said load circuits, and a movable switching member having first and second contacts engageable with said first mentioned first and second switch contacts, respectively, in the closed condition of said switching means, current-responsive means connecting said contacts of said movable switching member, an additional contact on, and connected directly to said first contact of, said movable switching member and engaging said third switch contact in said closed condition of said switching means, a fused pull-out switch member connecting said third contact to said last mentioned load terminal and a pull-out switch member having first and second contacts engageable with said first mentioned first and second switch contacts, respectively, in the closed condition of said switching means, current-responsive means connecting said contacts of said switch member, an additional contact on, and connected directly to said first contact of, said switch member and engaging said third switch contact in said closed condition of said switching means.

8. An electric distribution and control unit, comprising a base provided with a plurality of sets of load terminals, at least one of said sets comprising a series of branch circuit load terminals connected in parallel, a plurality of fuse receptacles, one for each of said branch circuits, mounted on said base, a fused pull-out switch mounted on said base and connected in series with another of said sets of load terminals, and a main pull-out switch mounted on said base for connecting said fuse receptacles and said fused pull-out switch in parallel to a source of current, said main pull-out switch having a line terminal, a stationary contact connected to said line terminal, a second stationary contact, a pair of movable contacts connected to each other and to said stationary contacts, respectively, said second stationary contact being connected directly to said first mentioned pull-out switch, said main pull-out switch having additional companion stationary and movable contacts, said last mentioned stationary contact being connected to all of said fuse receptacles, and a fuse connecting said last mentioned movable contact to said first mentioned movable contacts.

9. A current distribution and control unit for load circuits, comprising an insulation block having a switch receptacle, fixed first, second and third contacts in said receptacle for connection with a line terminal, a load terminal for a first load circuit and a load terminal for a second load circuit, respectively, and a pull-out switch member insertable in said receptacle into switch-closing position therein and having first and second electrical conductors adapted, in the closed switch position, electrically to connect said first and second contacts and said first and third contacts, respectively, only one of said conductors including a fuse.

10. A current distribution and control unit for load circuits, comprising an insulation block having main and auxiliary switch receptacles, fixed first, second and third contacts in said main receptacles of which said first and second contacts are for connection with a line terminal and a load terminal of first load circuit, respectively, fixed fourth and fifth contacts in said auxiliary receptacle of which said fourth contact is connected with said third contact and said fifth contact is for connection with a load terminal of a second load circuit, and pull-out main and auxiliary switch members insertable in said main and auxiliary receptacles, respectively, into their respective switch-closing positions, said main switch member having first and second electrical conductors adapted, in the closed position of said main switch member, electrically to connect said first and second contacts and said first and third contacts, respectively, said first conductor including a fuse and said second conductor being fuse-less, and said auxiliary switch member having a third conductor adapted, in the closed position of said auxiliary switch member, electrically to connect said fourth and fifth contacts.

11. A current distribution and control unit as set forth in claim 10, in which said third conductor includes a fuse.

12. A current distribution and control unit for load circuits, comprising an insulation block having a switch receptacle, first, second and third line terminals on said block for connection with the two live wires and the neutral wire, respectively, of a three-wire supply system, two first sets of load circuit terminals on said block, two second sets of load circuit terminals on said block associated with the terminals of said first sets, respectively, and connected with said third line terminal, other load terminals on said block for another load circuit, first, second and third pairs of fixed contacts in said receptacle, the contacts of said first pair being connected with said first and second line terminals, respectively, the contacts of said second pair being connected with the terminals of said first sets, respectively, and the contacts of said third pair being connected with said other load terminals, respectively, and a pull-out switch member insertable in said receptacle into switch-closing position therein and having first and second pairs of conductors of which the conductors of said first pair connect paired contacts, respectively, of said first and second pair, and the conductors of said second pair connect paired contacts, respectively, of said first and third pair, in the closed position of said switch member, each of the conductors of said first pair including a fuse, and the conductors of said second pair being fuse-less.

13. A current distribution and control unit as set forth in claim 12, further comprising a switch between and in series connection with said third contact pair and other load terminals.

14. A current distribution and control unit as set forth in claim 12, further comprising a fused switch between and in series connection with said third contact pair and other load terminals.

15. A current distribution and control unit as set forth in claim 12, further comprising another switch receptacle in said block, fourth and fifth pairs of fixed contacts in said other receptacle of which the contacts of said fourth pair are connected with the contacts, respectively, of said third pair and the contacts of said fifth pair are connected with said other load terminals, respectively, and an auxiliary pull-out switch member insertable in said other receptacle into switch-closing position therein and having conductors which, in the closed position of said auxiliary switch member, connect paired contacts, respectively, of said fourth and fifth pair.

16. A current distribution and control unit as set forth in claim 12, further comprising another switch receptacle in said block, fourth and fifth pairs of fixed contacts in said other receptacle of which the contacts of said fourth pair are connected with the contacts, respectively, of said third pair and the contacts of said fifth pair are connected with said other load terminals, respectively, and an auxiliary pull-out switch member insertable in said other receptacle into switch-closing position therein and having conductors which, in the closed position of said auxiliary switch member, connect paired contacts, respectively, of said fourth and fifth pair, one of said conductors of said auxiliary switch member including a fuse.

17. A current distribution and control unit as set forth in claim 12, further comprising another switch receptacle in said block, fourth and fifth pairs of fixed contacts in said other receptacle of which the contacts of said fourth pair are connected with the contacts, respectively, of said third pair and the contacts of said fifth pair are connected with said other load terminals, respectively, and an auxiliary pull-out switch member insertable in said other receptacle into switch-closing position therein and having conductors which, in the closed position of said auxiliary switch member, connect paired contacts, respectively, of said fourth and fifth pair, each of said conductors of said auxiliary switch member including a fuse.

RICHARD P. BALLOU.

REFERENCES CITED

The following references are of record in the file of this patent:

UNITED STATES PATENTS

| Number | Name | Date |
| --- | --- | --- |
| 1,910,686 | Frank | May 23, 1933 |
| 2,074,861 | Sachs | Mar. 23, 1937 |